Nov. 5, 1968  C. R. OLIVER  3,409,216
GREASE FLOW PREDICTOR
Filed April 18, 1967  2 Sheets-Sheet 2
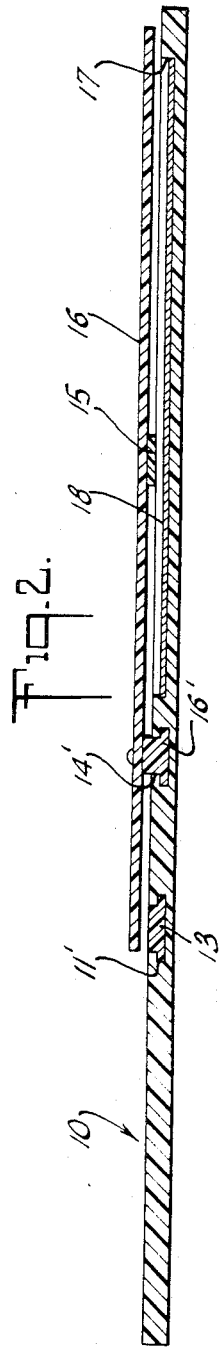
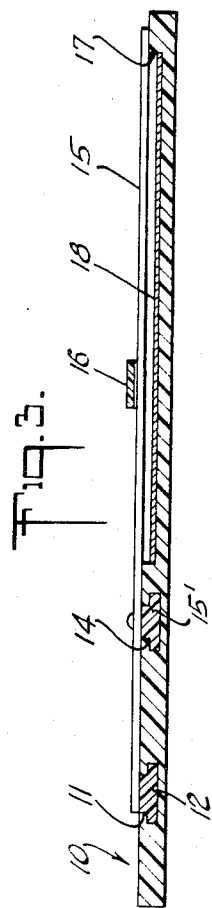
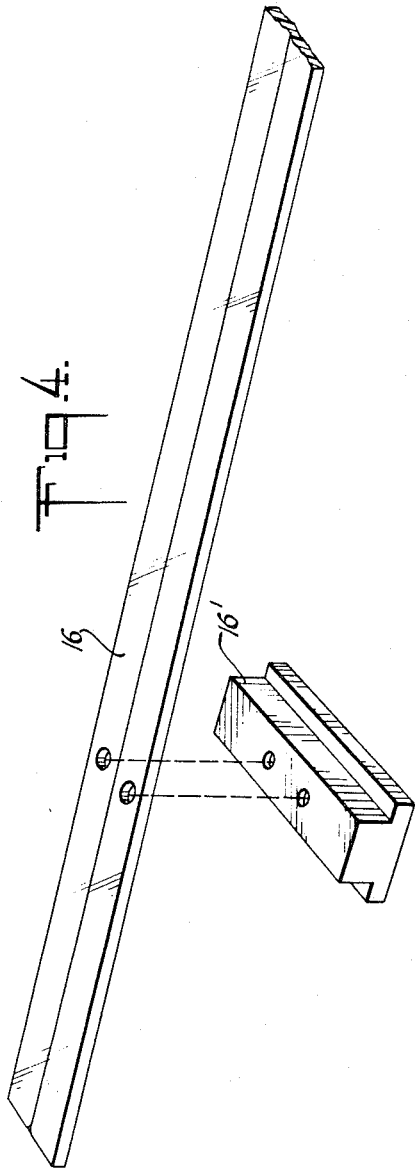

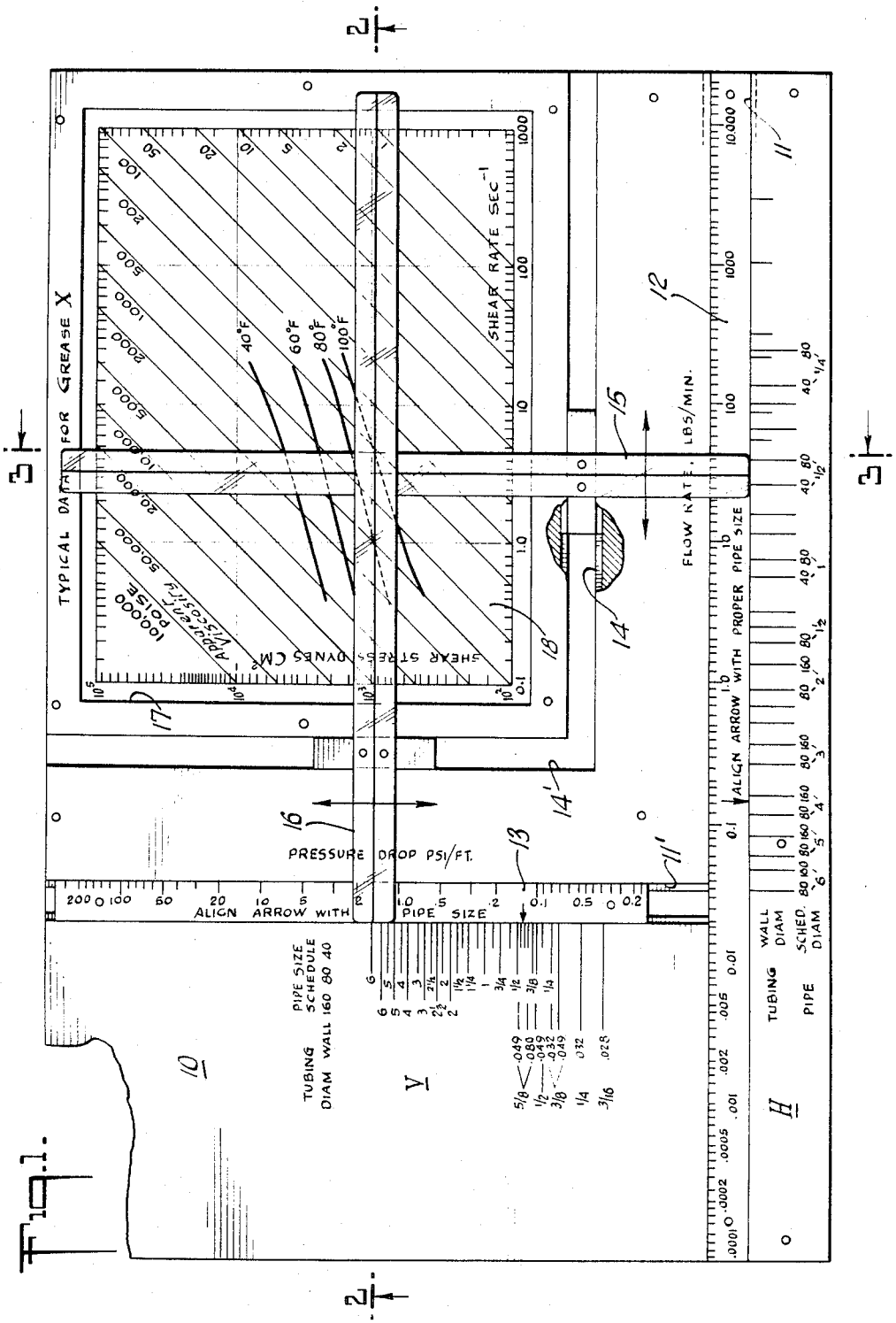

3,409,216
GREASE FLOW PREDICTOR
Charles R. Oliver, Hopewell Junction, N.Y., assignor to Texaco Inc., New York, N.Y., a corporation of Delaware
Filed Apr. 18, 1967, Ser. No. 631,626
4 Claims. (Cl. 235—61)

ABSTRACT OF THE DISCLOSURE

A device for predicting the flow behavior of grease when pumped through pipe or tubing, utilizing an insert data grid with flow curves (shear stress vs. shear rate at constant temperatures) for particular greases, with sliding scales of flow rate and pressure drop for use in setting against the size of pipe or tubing to be used, and with cursors having indicating crosshairs for relating the flow curves to the sliding scales.

---

The bulk handling of greases and centralized grease dispensing systems are concerned with the characteristics of a grease that affect its flow through pipes or tubing. In bulk deliveries, grease is pumped through large diameter fill lines (usually 3 to 4 inch pipe or hose) at flow rates which may be as high as 1,000 lb./min. In centralized dispensing systems, e.g. for lubrication, the grease is pumped for storage tanks into header lines which are generally 2–4 inch pipe and may be several thousand feet long, and then the grease flows through smaller diameter pipe or tubing to the individual dispensers.

Flow properties of greases will influence the design of a delivery system by dictating the limiting line diameter and length for a given pumping pressure and rate. Conversely, in an existing system, such flow properties will determine the pressure necessary for the desired flow rate or the flow rate that can be achieved with the available pump pressure. Similarly, from knowledge of its flow properties, the minimum temperature at which the grease can be pumped at a usable flow rate in a given system can be determined.

The property of a grease which has the greatest effect on flow characteristics is apparent viscosity, the internal resistance of a fluid to flow. In general, the coefficient of viscosity or, more simply, the viscosity, is the ratio of the shear stress (force per unit area required for flow) to the shear rate (velocity gradient normal to the direction of flow). For an ideal "Newtonian" fluid, this ratio is constant at any given temperature and is independent of rate of shear. Because of their complex structure, greases are non-Newtonian, i.e. their viscosities depend not only on temperature but on rate of shear. The shear stress-shear rate relationship of a typical Newtonian fluid is linear, the slope of the straight line being the coefficient of viscosity. Greases, which can be considered a type of non-Newtonian fluid called pseudo-plastic, have a shear stress-shear rate relationship which is non-linear, resulting in viscosities which are not constant at a given temperature but which vary with rate of shear. The concept of apparent viscosity has therefore been adopted to describe the viscous properties of greases and other non-Newtonian substances, apparent viscosity being the ratio of shear stress to rate of shear at a stated rate of shear (or stated shear stress).

Several methods for dealing with non-Newtonian behavior and the other complexities of greases usually employ rather difficult mathematics and frequently include parameters which are not well defined or not readily available. The most simplified of approximations for predicting grease flow characteristics is that which treats the grease as though it where a Newtonian fluid, a justifiable approach if the errors introduced by its use are small compared to the experimental errors and other uncertainties in the measurements involved, or if they are small enough to be tolerable for the sake of expediency. The validity of such a simplification has been demonstrated by a showing of reasonable agreement between pressure drops observed in actual installations and calculations using the apparent viscosity of the grease.

For example, Poiseuille's equation, expressed in a form suitable for grease flow calculations, is:

$$\eta_a = \pi \Delta p r^4 / 8lq \tag{1}$$

where:

$\eta_a$ = apparent viscosity at the temperature of interest, poises
$\Delta p$ = pressure drop, dynes/cm.$^2$
$r$ = radius of pipe or tubing, cm.
$l$ = length of pipe or tubing, cm.
$q$ = flow rate, cm.$^3$/sec.

Solving this equation for pressure drop per unit length of pipe or tubing yields:

$$\frac{\Delta p}{l} = \frac{8q\eta_a}{\pi r^4} \tag{1a}$$

Except for the expression of apparent viscosity in poise, the other metric units in this equation are inconvenient for engineering use in the United States. By means of the conversions $\Delta p$(dynes/cm.$^2$) = 68,944$\Delta P$(p.s.i.)
$l$(cm.) = 30.48$L$(ft.)
$r$(cm.) = 2.54$R$(in.)
$q$(cm.$^3$/sec.) = 0.273$Q$(in.$^3$/min.)

the equation becomes $$\frac{\Delta P}{L} = 7.387 \frac{Q\eta_a}{R^4} \times 10^{-6} \text{ p.s.i./ft.} \tag{2}$$

To obtain flow rate in gravimetric (lb./min.) rather than volumetric (in.$^3$/min.) units, substitute $$Q = Q'/\rho \tag{3}$$

where:

$Q$ = flow rate, in.$^3$/min.
$Q'$ = flow rate, lb./min.
$\rho$ = density, lb./in.$^3$ this gives $$\frac{\Delta P}{L} = 7.387 \frac{Q'\eta_a}{\rho R^4} \times 10^{-6} \text{ p.s.i./ft.} \tag{4}$$

As an additional simplification, a density of 0.0332 lb./in.$^3$ can be assumed as being typical for industrial greases. (Actual densities may vary from about 0.0321 to about 0.0343 lb./in.$^3$.) The equation then reduces to $$\frac{\Delta P}{L} = 0.2225 \frac{Q'\eta_a}{R^4} \times 10^{-3} \text{ p.s.i./ft.} \tag{5}$$

The apparent viscosity which is substituted in the above equation must be at the shear rate which corresponds to the specified flow rate.

The relation between shear rate and flow rate in the Poiseuille equation is $$S = 4q/\pi r^3 \tag{6}$$

or $$S = 0.02122 \frac{Q}{R^3} \tag{6a}$$

or $$S = 0.02122 \frac{Q'}{\rho R^3} \tag{6b}$$

where $S$ = shear rate, reciprocal seconds (sec.$^{-1}$).

For the assumed density of 0.0332 lb./in.³

$$S = 0.639 \frac{Q'}{R^3} \quad (7)$$

If pressured drop is specified instead of flow rate, apparent viscosity at the shear stress corresponding to the pressure drop must be used. The relation between shear stress and pressure drop is $$\tau = \frac{r}{2} \frac{\Delta p}{l} \quad (8)$$

$$\tau = 2873 R \frac{\Delta P}{L} \quad (9)$$

where $\tau$=shear stress, dynes/cm.² (shear stress is seldom expressed in English units of lb./in.²).

A further simplification of the above expressions can be made by incorporating the pipe or tubing radius into the constant to give the following relationships:

$$\frac{\Delta P}{L} = K_1 Q' \eta_a \quad (10)$$

$$S = K_2 Q' \quad (11)$$

$$\tau = K_3 \frac{\Delta P}{L} \quad (12)$$

In the foregoing equations, $K_1$, $K_2$, and $K_3$ are constants which depend only on the pipe or tubing radius and the density of the grease. For the assumed density of 0.0332 lb./in.³, the constants are derived from Equations 5, 7, and 9 as follows:

$$K_1 = \frac{0.2225}{R^4} \times 10^{-3} \quad (13)$$

$$K_2 = 0.639/R^3 \quad (14)$$

$$K_3 = 2873 R \quad (15)$$

Tables I and II in vol. 51, No. 10 of the technical publication of Texaco Inc. entitled "Lubrication" give the values of the three constants for commonly used pipe and tubing sizes (all dimensions are in inches). Pipe sizes are listed by the nominal diameter and schedule number; the latter is a designation of wall thickness according to American Standard B36.10–1959 for wrought steel and wrought iron pipe.

The solution of flow problems with the Poiseuille equation requires knowledge of the grease's apparent viscosity as a function of shear rate at the appropriate temperature. Because of the relation between apparent viscosity, shear rate, and shear stress, a plot of shear stress vs. shear rate at contant temperature can be used also and is, in fact, a more convenient form for solving flow problems.

For a more definitive disclosure on the flow of grease in pipes and tubings, reference is made again to the publication entitled, Lubrication, vol. 51, No. 10. Although the basic flow properties of grease are expressed in terms of shear rate and shear stress, the related parameters of flow rate and pressure drop are more useful in engineering work. The above publication describes a graphical method for solving flow problems directly in the engineering parameters. The method is based on a logarithmic plot of shear stress vs. shear rate in conjunction with scales for specific pipe and tubing sizes. Charts based on this method are being investigated by an appropriate Subcommittee of the National Lubricating Grease Institute (NLGI) for possible adoption as a recommended practice. Charts of this type are relatively unweildy because practice considerations limit the number of scales for specific pipe or tubing sizes that can be placed on a single chart. For example, NLGI uses four charts to cover the range of pipe and tubing sizes commonly used in bulk handling and centralized dispensing systems. Flow curves for a grease therefore must be repeated on each of the four charts.

This invention simplifies the graphical solution of non-Newtonian fluid (e.g., grease) flow problems by facilitating consideration of any of a large number of pipe or tubing sizes with a single plot of flow properties. Further simplification is achieved by use of adjustable crosshairs to relate the flow curves to the scale for flow rate and pressure drop, thereby eliminating the need for drawing lines on the chart each time it is used. Additional benefit results from improved readability of the flow rate and pressure drop scales on this device compared with charts containing individual scales for several pipe or tubing sizes.

This invention concerns a grease flow predictor consisting of a base member supporting one horizontal and one vertical sliding scale, one horizontal and one vertical sliding cross hair indicator, and an insert data grid calibrated logarithmically on which are plotted lines of shear stress vs. shear rate at constant temperature for greases of interest. The horizontal sliding scale is calibrated logarithmically for flow rate in lb./min., and the vertical sliding scale is calibrated logarithmically to the same scale for pressure drop per foot of pipe or tubing in units of p.s.i./foot. Parallel to each of these sliding scales, on the base member, is a fixed scale bearing markings for the more common sizes of pipes and tubings used. Each of the sliding scales has an index arrow for alignment with its corresponding fixed scale at the marking for the particular pipe or tubing size under consideration, thus enabling the single pair of sliding scales to be used for all the sizes of pipe or tubing (as indicated on the base member). The insert data grid is a sheet of paper or other thin, flexible material, bearing a logarithmic grid of the same modulus as the calibrations on the sliding scales. The grid is labeled in units of shear rate on the abscissa and shear stress on the ordinate. Line of constant viscosity appear as diagonal straight lines on the grid and are shown for reference purposes. On the grid are plotted lines of shear stress vs. shear rate at constant temperature, hereafter called flow properties, for grease or greases of interest. Since the grids are removable, different greases may be plotted on separate grid sheets for greater clarity and utility.

The invention will become apparent from the following description, taken in conjunction with the drawings, in which:

FIG. 1 is a plan view of the grease flow predictor;

FIGS. 2 and 3 are cross sections taken respectively across the lines 2—2 and 3—3 in FIG. 1; and FIG. 4 is an exploded isometric view of the cursor used in the predictor.

Referring now to the drawings, there is shown in FIG. 1 a relatively stiff base member 10 of metal, plastic, cardboard or the like, in which there are a pair of intersecting grooves 11, 11' positioned in orthogonal relationship to each other for the reception of slide members 12, 13. Parallel to each of these grooves is a series of graduations, indicated generally as H and V, corresponding to pipe diameters and wall thicknesses, indicated respectively as DIAM and SCHED, and to tubing wall thicknesses and diameters, indicated respectively as WALL and DIAM. Because of the mathematical relationship between flow rate and pressure drop, the graduations along the vertical axis are scaled to one third those along the horizontal axis. These graduations could be calibrated to indicate inside diameters directly inasmuch as the present calibrations of pipe or tubing size and corresponding wall thickness indicate the same information. Each of the two slide members carry logarithmic scales to the same modulus and in addition an alignment arrow for use in positioning the slide member with the choice of pipe or tubing desired. There are intersecting grooves 14, 14', which are parallel to the orthogonal grooves 11, 11', for receiving the two cursors 15, 16 with indicating cross hairs thereon. Finally, recess or well 17 is formed in the base member 10 so that the edges thereof are parallel to the edges of the several grooves and located thereon so that the origin thereof is related to the pipe and tubing graduations. This well receives insert data grids indicated at 18, fitted snugly therein, one grid only being indicated in the drawings. For convenience, a separate data grid is used for every grease. Each insert contains flow data at constant temperatures for the particular grease plotted in the form of shear rate (sec.$^{-1}$) against shear stress (dynes per square centimeter) on a logarithmic scale. Lines of constant viscosity are shown on the grid for reference purposes.

FIG. 4 is an exploded isometric view of cursor 16 which is mounted on its pedestal 6', joined thereto by appropriate fastening means, such as screws or rivets (not shown). The pedestal 16', FIG. 2 is greater in height than the corresponding pedestal 15', FIG. 3, in order that there may be sufficient clearance between the cursors, as shown in FIG. 2. Alternately, if the pedestals 15' and 16' are the same height, a spacer or shim (not shown) could be added to either pedestal to obtain the desired clearance. The length of the pedestal housed in each groove should be great enough to maintain alignment of the cursor. An alternate arrangement (not shown) for supporting the cursors parallel to the axes of the insert grids is to have them slide in grooves in the edges of the base member.

The general position of the data grid well, the flow rate and pressure drop scales on sliding members 12 and 13 respectively, and the index arrows on these sliding members is a matter of choice. Once these positions are fixed, they determine the layout of scales H and V on the base member 10. Accomplishment of this layout can be described best by example as follows. Assume we wish to locate the marks for 2" schedule 80 pipe on scales H and V. Further assume a convenient flow rate, say 1.0 lb./min. From the previously derived Formula 11 above, shear rate is $S=.7012Q'$ or, in this case, $S=.7012$ sec.$^{-1}$ (since $Q'=1.0$), where .7012 is constant $K_2$ obtained from Table I in the aforementioned Lubrication issue. Thus, when the indicating hairline of cursor 15 is lined up with a shear rate of .7012 on the insert data grid and sliding member 12 is positioned with flow rate 1.0 under the indicating hairline, the index arrow on sliding member 12 will point to the position of the mark for 2" schedule 80 pipe on fixed scale H. Now assume a convenient pressure drop for this size pipe, say 1.0 p.s.i./ft. From the previously derived formula 12, shear stress is $$\tau = 2785 \frac{\Delta P}{L}$$

or, in this case, $\tau=2785$ dynes/cm.$^2$ $$\left(\text{since } \frac{\Delta P}{L}=1.0\right)$$

where 2785 is constant $K_3$ from Table II of the aforementioned Lubrication issue. Thus, when the indicating hairline of cursor 16 is lined up with a shear stress of 2785 on the insert data grid and sliding member 13 is positioned with pressure drop 1.0 p.s.i./ft. under the hairline, the index arrow on slide 13 will point to the position of mark for 2" schedule 80 pipe on fixed scale V. The markings for each pipe and tubing size are located on fixed scales H and V in a similar manner. Other methods of locating the data on the base member could be used, e.g. fixing the positions of the other members and determining the position of each index arrow.

In using the grease flow predictor, the sliding members 12 and 13 are first positioned with their index arrows opposite the marks for the pipe or tubing size of interest on the fixed scales. A cursor with the indicating crosshair is then aligned with whichever is known (or desired) (either the flow rate or pressure drop), and the second cursor with its indicating crosshair is moved so that the crosshairs intersect at the proper line of shear stress vs. shear rate determined by the temperature, and then either the desired pressure drop or flow rate is read directly from the proper slide member. Also, the lowest temperature at which a given system will operate satisfactorily is determined by aligning the crosshairs with the proper pressure drop and flow rate and reading the temperature corresponding to the shear stress vs. shear rate curve where the crosshairs meet. Where curves are spaced apart and the intersection occurs between them, a proper interpolation is to be made.

Pipe or tubing sizes are determined by a trial and error approach in which the pressure drop and flow rate are determined for arbitrarily chosen pipe or tubing sizes. In addition, the grease flow predictor is readily adaptable to a simple linkage arrangement which will move both sliding scales in unison, if this should become desirable.

Thus, under steady flow conditions, the grease flow predictor is useful in predicting pressure drop, or predicting flow rate, or determining operating temperature or choosing line sizes vs. flow requirements.

Its use is not restricted to greases and can be used with any non-Newtonian fluid for which shear stress vs. shear rate curves at constant temperature can be provided. The predictor could be used also for Newtonian fluids but such use is unlikely because the constant ratio of shear stress to shear rate simplifies the solution of flow problems and simpler nomographs could be devised.

Obviously, other modifications and variations of the invention as hereinbefore set forth may be made without departing from the spirit and scope thereof, and therefore, only such limitations should be imposed as are indicated in the appended claims.

I claim:
1. A grease flow predictor comprising a base member having a well and a data grid positioned therein, said data grid having a first series of logarithmic graduations thereon located in orthogonal relation to each other, a second series of logarithmic graduations located on said base member parallel to and spaced from said first series of graduations, slide members having a third series of logarithmic graduations located thereon, said slide members being positioned contiguous and parallel to said second series of graduations and each carrying an indicator other than indicia for alignment with selected graduations on said second series, said first, second and third series of graduations each representing different functions and said second and third series of graduations having the ordinate series scales one third that of the abscissa series scales, and a pair of cursors supported on said base member for parallel movement and alignment with relation to said first and said third series of graduations.

2. In a grease flow predictor according to claim 1, said first series of graduations being to the same modulus as that of said third series of graduations and indicating the shear rate on the abscissa scale and the shear stress on the ordinate scale, said second series of graduations indicating pipe and tubing dimensions, said third series of graduations having the ordinate scale calibrated for pressure drop in p.s.i./foot and the abscissa scale calibrated for flow rate in pounds/minute, said data grid having curves of apparent viscosity and constant temperature thereon.

3. In a grease flow predictor according to claim 2, the position of said second series of graduations being determined by solution of the relationships between shear rate and flow rate and between shear stress and pressure drop, by use of said slide members and said data grid, the relative positions of which have been preselected generally.

4. In a grease flow predictor according to claim 3, said pipe and tubing dimensions standing for diameters and wall thicknesses whereby the inside diameters thereof are known, said data grid comprising a series of replaceable charts housed exactly within said well.

(References on following page)

References Cited

UNITED STATES PATENTS

| | | | |
|---|---|---|---|
| 2,300,401 | 11/1942 | Basler et al. | 235—61 |
| 2,436,352 | 2/1948 | Downs | 235—61 |
| 2,513,491 | 7/1950 | Killough | 235—89 |
| 2,520,904 | 9/1950 | Boehm | 235—89 |
| 2,666,577 | 1/1954 | Parker | 235—61 |
| 2,682,709 | 7/1954 | Watson | 235—61 |

FOREIGN PATENTS

| | | |
|---|---|---|
| 309,309 | 4/1929 | Great Britain. |

ROBERT S. WARD, Jr., *Primary Examiner.*

STANLEY A. WAL, *Assistant Examiner.*